United States Patent
Lounis

(10) Patent No.: US 11,635,200 B1
(45) Date of Patent: Apr. 25, 2023

(54) LIGHTED RAILING ASSEMBLY HAVING SOLAR PANEL AND LIGHT SENSOR

(71) Applicant: Said Lounis, Naples, FL (US)

(72) Inventor: Said Lounis, Naples, FL (US)

(*) Notice: Subject to any disclaimer, the term of this patent is extended or adjusted under 35 U.S.C. 154(b) by 0 days.

(21) Appl. No.: 17/679,201

(22) Filed: Feb. 24, 2022

(51) Int. Cl.
| | | |
|---|---|---|
| *E04F 11/18* | (2006.01) | |
| *F21V 33/00* | (2006.01) | |
| *H02S 40/34* | (2014.01) | |
| *F21S 9/03* | (2006.01) | |
| *F21W 111/08* | (2006.01) | |
| *F21Y 115/10* | (2016.01) | |

(52) U.S. Cl.
CPC ............ *F21V 33/006* (2013.01); *E04F 11/18* (2013.01); *F21S 9/035* (2013.01); *H02S 40/34* (2014.12); *E04F 2011/1872* (2013.01); *F21W 2111/08* (2013.01); *F21Y 2115/10* (2016.08)

(58) Field of Classification Search
CPC ....... E04F 2011/1872; F21S 4/28; F21S 8/03; F21S 9/035
USPC .......................................................... 362/146
See application file for complete search history.

(56) References Cited

U.S. PATENT DOCUMENTS

| | | | | |
|---|---|---|---|---|
| 3,448,257 A * | 6/1969 | Sackett, Jr. | ............ | F21V 33/006 362/146 |
| 3,740,541 A * | 6/1973 | Conradt | ................... | F21V 23/00 52/28 |
| 5,099,402 A * | 3/1992 | Starniri | ................... | E04F 11/18 362/276 |
| 5,450,299 A * | 9/1995 | Lepre | .................. | E04F 11/1804 362/276 |
| 6,425,676 B1 * | 7/2002 | Lyons | .................. | G02B 6/0091 362/240 |
| 7,441,919 B2 * | 10/2008 | Sheridan | ................... | F21S 4/20 362/151 |
| 8,210,705 B2 * | 7/2012 | Pesson | ................. | F21V 23/0442 362/276 |
| 8,235,554 B2 * | 8/2012 | Steinkraus | .............. | F21V 14/04 362/217.05 |
| 10,378,740 B2 * | 8/2019 | Stuart | .................. | F21V 23/0464 |
| 2008/0304253 A1 * | 12/2008 | Handsaker | ................. | F21S 4/28 362/146 |
| 2009/0109666 A1 * | 4/2009 | Striebel | ..................... | F21S 4/28 362/225 |
| 2019/0338940 A1 * | 11/2019 | Shepherd | ................. | F21V 31/00 |
| 2022/0010955 A1 * | 1/2022 | Katou | ........................ | F21V 9/30 |

FOREIGN PATENT DOCUMENTS

KR 101219581 B1 * 1/2013 .............. F21S 9/035

* cited by examiner

*Primary Examiner* — Ismael Negron
(74) *Attorney, Agent, or Firm* — Carlson, Gaskey & Olds, P.C.

(57) ABSTRACT

A lighted railing assembly with at least one railing member includes an inner cavity, a battery disposed within the inner cavity and a lighting device powered by the battery. A solar panel is integrated into the railing member and is electrically coupled to charge the battery. A controller is configured to control charging of the battery and activation of the lighting device in response to a signal provided by an ambient light sensor.

13 Claims, 4 Drawing Sheets

LIGHTED RAILING ASSEMBLY HAVING SOLAR PANEL AND LIGHT SENSOR

TECHNICAL FIELD

The present disclosure relates to lighting system for a railing and particularly to a self-contained safety lighting system.

BACKGROUND

Railings are provided both indoors and outdoors as a safety feature to aid in navigating stairways and for elevated areas such as balconies and decks. Lights are sometime attached to the railing to improve visibility at night and to provide a desired aesthetic appearance. The lights require a power source that may not always be available particularly in emergency or power outage conditions. As appreciated, emergency conditions are when such lighting is most useful and valuable. Moreover, the location of many outdoor railings are remote from a convenient power source and therefore use of such lighting may be costly or simply not pursued.

The background description provided herein is for the purpose of generally presenting a context of this disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A lighted railing assembly according to an example disclosed embodiment includes, among other possible things, at least one railing member including an inner cavity, at least one battery disposed within the inner cavity and at least one lighting device powered by the battery. At least one solar panel is integrated into the railing member and is electrically coupled to charge the battery. The solar panel provides for operation of the lighting device in circumstances where external power is unavailable, such as during a power outage. Additionally, the example lighted railing assembly provides for installations in location where external power is not available.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
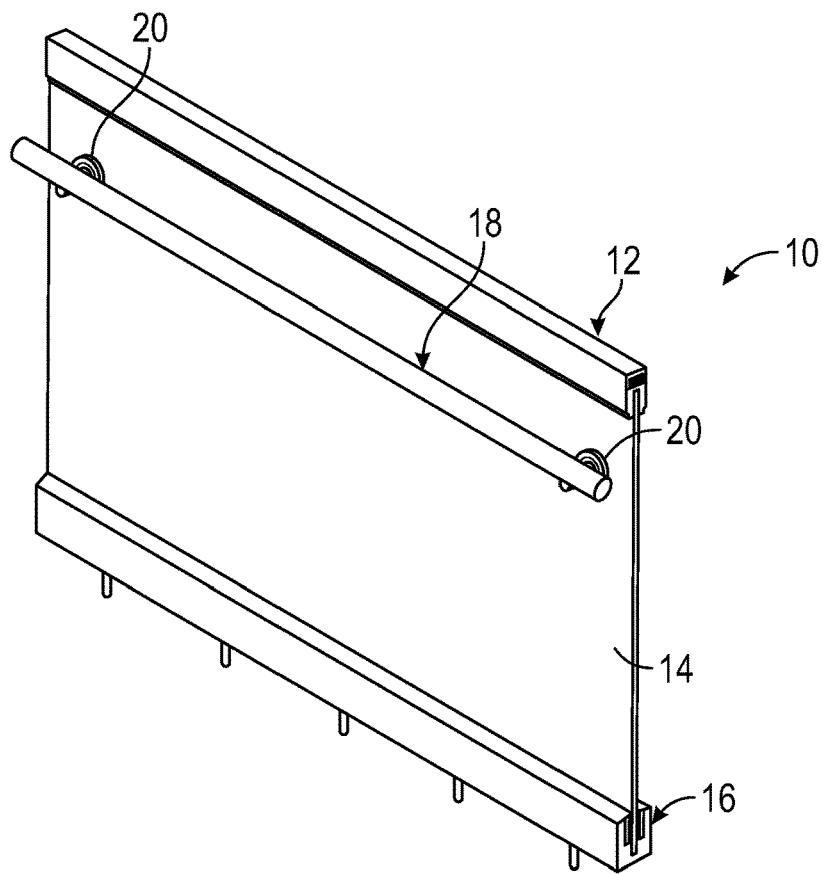
FIG. 1 is a schematic view of an example self-contained lighted railing assembly embodiment.
Figure 2:
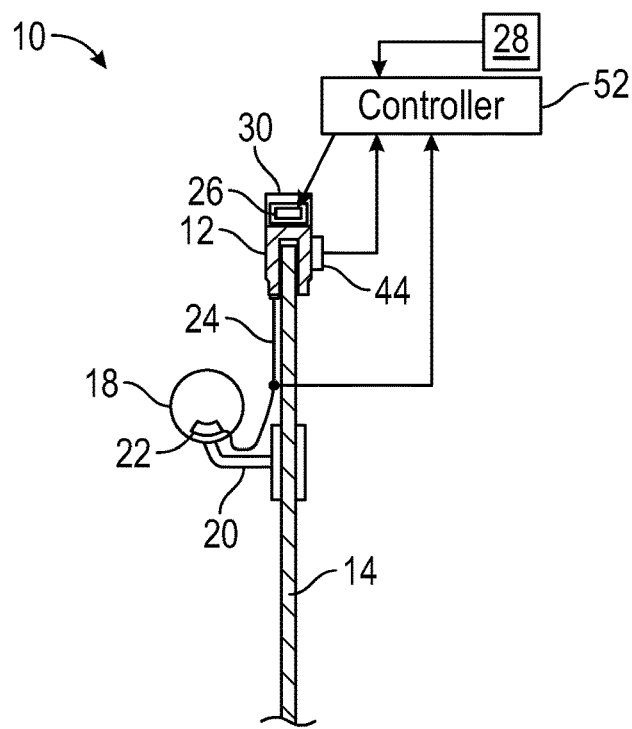
FIG. 2 is a cross-sectional view of the example railing assembly including a battery for powering a light.

Referring to FIGS. 1 and 2, a self-contained lighted railing assembly 10 is shown and includes a top cap 12 a glass panel 14 and a bottom shoe 16. A grab rail 18 is supported on the glass panel 14 by brackets 20. As appreciated, although a glass panel 14 is illustrated by way of example, any panel or baluster configuration could be utilized and is within the contemplation and scope of this disclosure. Moreover, the example railing assembly 10 may be formed with a railing formed from metal, plastic, steel or any combination thereof. Additionally, the example railing assembly 10 may be installed in any location where safety railings are desired including for walkways and crowd control at either elevated positions or at ground level.

In this disclosed example, the top cap 12 includes an inner compartment 30 that contains a battery 26. The battery 26 is electrically coupled to an external power source 28. The power supply charges the battery 26. The battery 26 provides power through a power lead 24 to a lighting device 22. In this example, the lighting device 22 is a light emitting diode (LED) disposed within the grab rail 18. The example LED may be tri-colored to provide for selection of a specific color of light. The example LED may also be a white LED device. As appreciated, although an LED is disclosed by way of example, other lighting devices could be utilized and are within the contemplation and scope of this disclosure.

Although the lighting device 22 is disposed within the grab rail 18 in one disclosed example, the lighting device 22 may be located within the top cap 12, along with any other location along the rail assembly 10. The power lead 24 may be arranged in a manner that is not visible to maintain an uncluttered appearance. The lighting device 22 in this example, emits a light downward to illuminate a path near the railing assembly 10. As appreciated, the lighting device 22 could be arranged to direct light in any direction desired to direct illumination and provide a desired illuminated appearance.

A controller 52 is schematically shown and governs charging of the battery 26 and routing of electric power to the lighting device 22. In this example, the controller 52 is a processor that is programmed to provide control of electric power communication between the external power source 28, the battery 26 and the lighting device 22. The controller 52 may include a memory device for storing software instructions that govern operation.

The example controller 52 controls switching between the external power source 28 and the battery 26 when the external power source 28 is unavailable. The battery 26 charges when power from the power source 28 is available. In circumstances where the power source 28 is not available, the controller 52 routes stored energy from the battery 26 to the lighting device 22 to maintain lighting.

The lighting device 22 may be illuminated based on ambient light conditions or based on time of the day. In one example embodiment, a light sensor 44 generates a signal indicative of ambient light conditions and communicates that information to the controller 52. The controller 52 uses the information from the light sensor 44 to control actuation of the lighting device 22 based on ambient light conditions. Accordingly, the controller 52 may further be programmed and configured to actuate the lighting device 22 to a signal from the light sensor indicative of predetermined ambient light condition. The lighting device 22 may also be turned on in response to a power outage condition to provide illumination in emergency conditions. Such emergency lighting an be accomplished when the ambient light is low as senses by the light sensor 44 and/or simply in response to a loss of power from the external power source.

Figure 3:
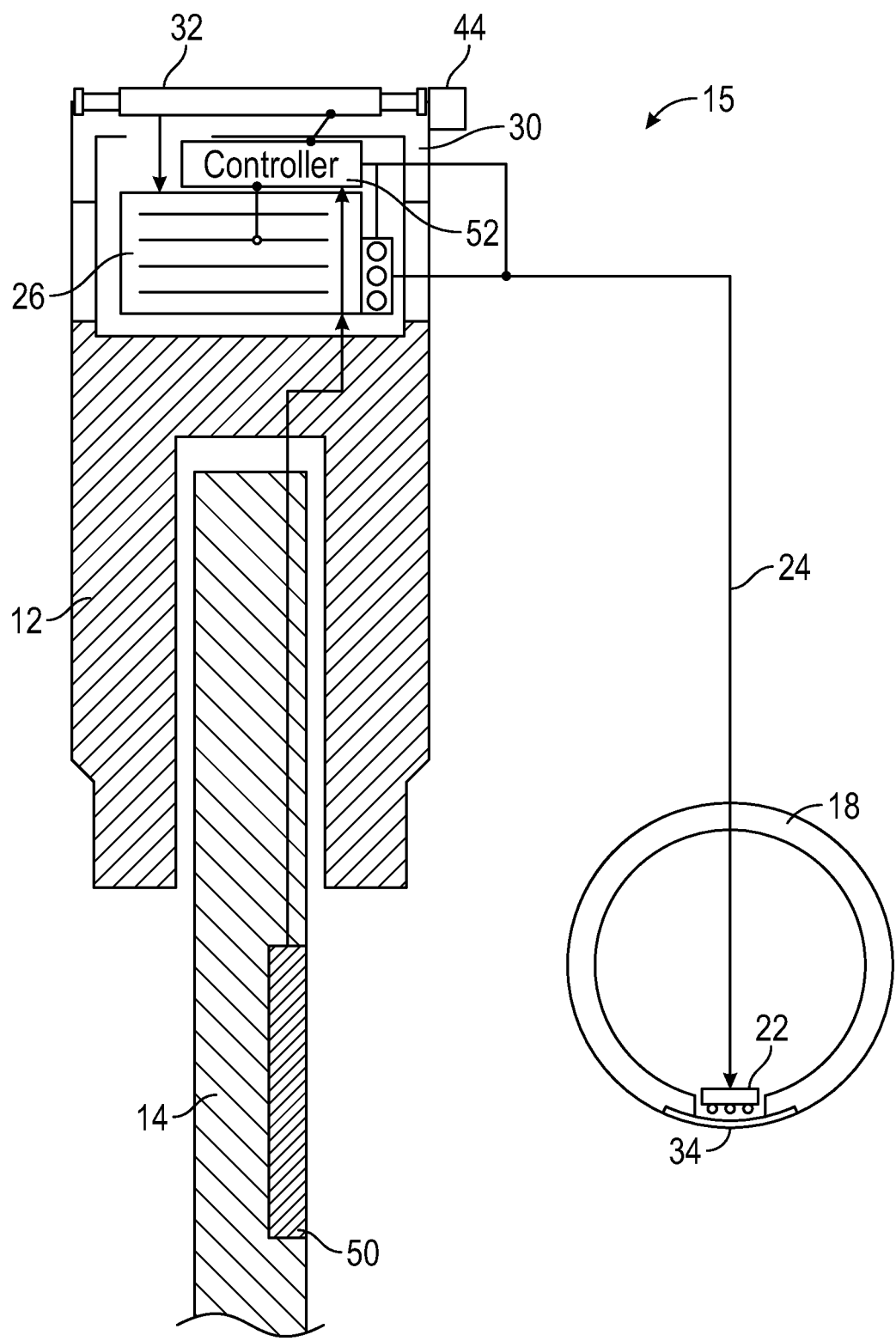
FIG. 3 is a cross-section of another example self-contained lighted railing assembly embodiment.

Referring to FIG. 3, another example lighted railing assembly 15 is schematically shown and includes a solar panel 32 electrically coupled to the battery 26. The solar panel 32 is supported on a top surface of the top cap 12 to provide exposure to sunlight. The solar panel 32 charges the battery 26 during daylight hours. As night falls and illumination of the lighting device 22 is desired, the battery 26 will provide power as directed by the controller 52.

The example solar panel 32 is provided in the top surface of the top cap 12 and is integrated into the top cap 12 to provide a substantially smooth and non-intrusive appearance. In this example, a single solar panel 32 is shown, however, several solar panels 32 may be arranged along the top cap 12 to provide sufficient power to charge the battery 26. Moreover, the battery 26 is shown schematically and may be differently shaped, and/or may include several batteries 26 disposed along a length of the top cap 12. Additionally, a plurality of lighting devices 22 and batteries 26 may be utilized and provided to accommodate installation specific lighting requirements. Additionally, any transformer and/or electrical device required to condition electric power for the lighting devices 22 may also be supported within the compartment 30 in the top cap 12.

In the disclosed example embodiment shown in FIG. 3, the glass panel 14 includes a solar glass panel indicated at 50 that provides electric energy to charge the battery 26. The solar glass panel 50 is shown as a portion of the glass panel 14, but may comprise the entire panel 14 or may be sections of the panel 14. The number and size of solar glass panels 50 may vary within the scope and contemplation of this disclosure to tailor power need to installation specific requirements.

Figure 4:
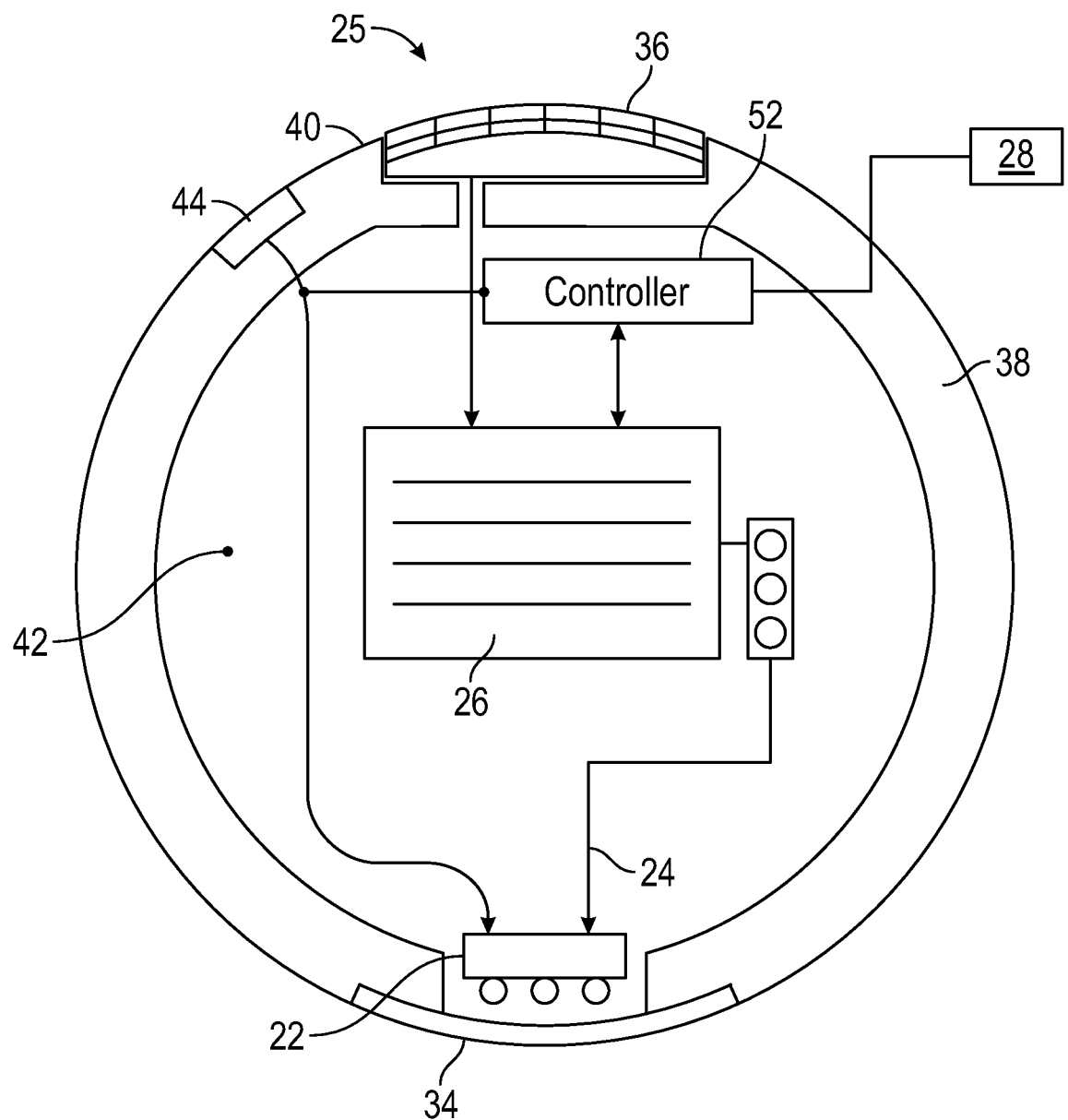
FIG. 4 is a cross-section of yet another example self-contained lighted railing assembly embodiment.

Referring to FIG. 4, another example lighted railing assembly 25 is schematically shown and includes the battery 26 and controller 52 are disposed within an inner cavity 42 of a grab rail 38. A solar panel 36 is integrated into an outer surface 40 of the grab rail 38 and generates electric power to charge the battery 26. Optionally, the battery 26 may be charged by an external power source that is schematically indicated at 28. The external power source 28 and the solar panel 36 may work together to power the battery 26 with the solar panel 36 providing power in the absence of external power 28 due to an outage.

The solar panel 36 may be the only power source providing power to the battery 26 to make the example railing assembly 25 self-contained. Moreover, although the solar panel 36 is shown by way of example on the grab rail 38, it may be located at other locations within the scope and contemplation of this disclosure.

In one example mode of operation, the example railing assemblies 15, 25 are completely self-contained and uses the solar panels 32, 36 to charge the battery 26. The batteries 26 are charged during daylight hours. The battery 26 powers the lighting devices 22 at night.

In this disclosed example, the lighting device 22 is disposed at a bottom portion of the grab rail 38 and directs light through a clear lens 34. The clear lens 34 provides protection to the interior components within the cavity 42 while providing for light to be directed toward a desired location.

The example lighting devices 22 may be provide illumination to provide a desired appearance and/or may provide illumination required in emergency conditions. The number and orientation of the lighting devices 22 may be varied to tailor the brightness, color or location to installation specific requirements. It should be further appreciated that although several locations for solar panels are described and disclosed by way of example, the solar panel may be included and mounted within other structures of the disclosed railing assemblies.

Figure 5:
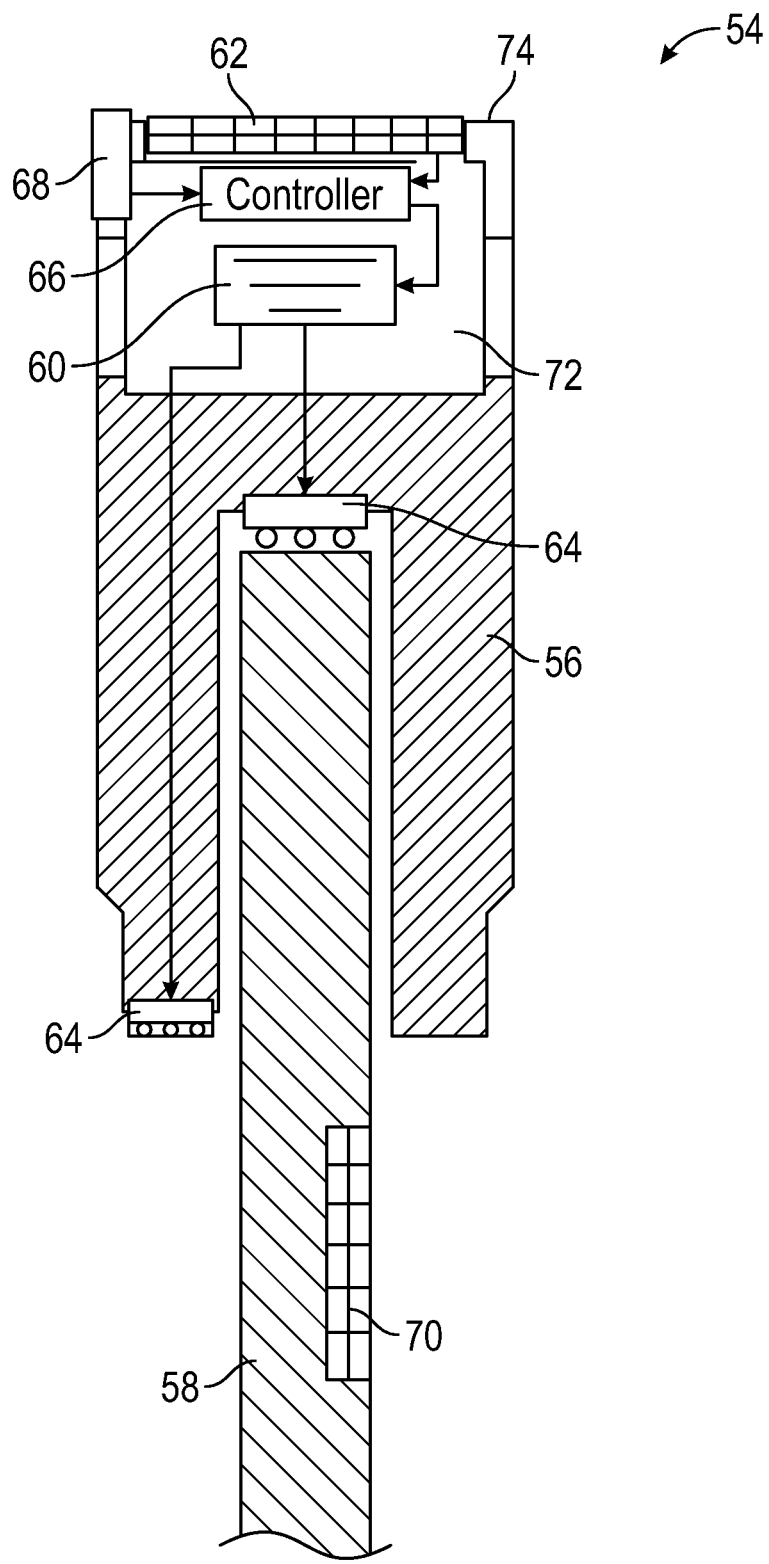
FIG. 5 is a cross-section of another example self-contained lighted railing assembly embodiment.

Referring to FIG. 5, another example lighted railing member embodiment is schematically indicated at 54 and is self-contained without connection to an external power source. In this example, the railing member is a top cap 56 that includes an inner cavity 72. The top cap 56 is disposed atop a panel 58. The example panel 58 is formed from a tempered glass pane, but may also formed from other materials and formed in other shapes and sizes. A battery 60 and controller 66 are disposed within the cavity 72 and are hidden from view. Access may be provided by a concealed removable panel that is not shown. The battery 60 is in electric communication with a solar panel 62. The solar panel 62 forms a portion of a top surface 74 of the top cap 56. The solar panel 62 is inset into the top surface to provide a smooth flush integrated configuration.

Lighting devices 64 are mounted to the top cap 56 to provide and direct light along a path adjacent to the railing member 54. One of the lighting devices is arranged to direct light into the panel 58 to provide both lighting and a desired aesthetic appearance. As appreciated from this disclosure the lighting devices 64 may be mounted and located in various positions to provide and direct light as desired to tailor illumination to application specific requirements.

The disclosed example lighted rail assemblies include an integrated and concealed battery that enables illumination during periods without available external power. Additionally, example embodiments of the lighted rail assemblies enable a self-contained lighting system that may provide for installation in areas were external power is not practical.

Although an example embodiments has been disclosed, a worker of ordinary skill in this art would recognize that certain modifications would come within the scope of this disclosure. For that reason, the following claims should be studied to determine the scope and content of this disclosure.

What is claimed is:

1. A lighted railing assembly comprising:
   a top cap including an inner cavity;
   a battery disposed within the inner cavity;
   at least one lighting device powered by the battery; and
   a solar panel electrically coupled to the battery and configured to charge the battery, wherein the solar panel is integrated into the top cap and comprises a top surface of the top cap such that the solar panel is flush with the top surface of the top cap.

2. The lighted railing assembly as recited in claim 1, wherein the top cap includes the inner cavity, and the at least one lighting device is mounted within the inner cavity.

3. The lighted railing assembly as recited in claim 1, including at least one controller programmed to control charging of the battery with power from the solar panel.

4. The lighted railing assembly as recited in claim 3, wherein the at least one controller is supported by the top cap.

5. The lighted railing assembly as recited in claim 3, further including a light sensor for generating a signal indicative of ambient light, the light sensor in communication with the controller and the controller is further configured to actuate the lighting device responsive to a signal from the light sensor indicative of predetermined ambient light condition.

6. The lighted railing assembly as recited in claim 1, further including a grab rail.

7. The lighted railing assembly as recited in claim 6, wherein the at least one lighting device is mounted within the grab rail.

8. The lighted railing assembly as recited in claim 7, wherein the at least one lighting device is mounted to direct light downward.

9. A lighted railing assembly comprising:
at least one railing member including a first inner cavity;
at least one battery disposed within the first inner cavity;
at least one solar panel integrated into the railing member, wherein the at least one solar panel is electrically coupled to charge the at least one battery; and
at least one lighting device electrically coupled to the battery; wherein the at least one railing member comprises a top cap including the first inner cavity and a grab rail with a second inner cavity, wherein the at least one battery is disposed within at least one of the first inner cavity and the second inner cavity and the at least one lighting device is mounted to one of the top cap and the grab rail.

10. The lighted railing assembly as recited in claim 9, wherein the at least one lighting device is integrated into a portion of the railing member.

11. The lighted railing assembly as recited in claim 10, including a light sensor for generating a signal indicative of ambient light surrounding the rail member, the light sensor in communication with a controller that is programmed to actuate the at least one lighting device responsive to a signal from the light sensor indicative of predetermined ambient light condition.

12. A lighted railing assembly comprising:
a top cap including a first inner cavity;
a battery disposed within the first inner cavity;
a grab rail including a second inner cavity; and
at least one lighting device powered by the battery, wherein the at least one lighting device is mounted within the second inner cavity and is electrically coupled to the battery disposed within the first inner cavity.

13. A lighted railing assembly comprising:
a top cap including an inner cavity;
a battery disposed within the inner cavity;
at least one lighting device powered by the battery;
a solar panel electrically coupled to the battery and configured to charge the battery, the solar panel integrated into the top cap;
a railing panel, the top cap disposed on the railing panel; and
a grab rail attached to the railing panel, wherein the at least one lighting device is disposed within the grab rail.

\* \* \* \* \*